United States Patent
Yokota et al.

[11] 3,852,113
[45] Dec. 3, 1974

[54] POSITIVE ELECTRODE FOR HIGH ENERGY PRIMARY CELLS AND CELLS USING SAME

[75] Inventors: Noriyuki Yokota, Ashiya; Nobuatsu Watanabe, Kyoto; Shingo Tokuda, Nishinomiya; Yasuhiro Kanaya; Hirokatsu Shimizu, both of Osaka, all of Japan

[73] Assignee: Osaka Soda Co., Ltd., Osaka, Japan

[22] Filed: Dec. 27, 1972

[21] Appl. No.: 318,775

[30] Foreign Application Priority Data
Dec. 30, 1971  Japan.................................. 46-2595
Apr. 1, 1972  Japan................................ 47-32713
Aug. 8, 1972  Japan................................ 47-79792

[52] U.S. Cl............ 136/83 R, 136/100 R, 136/121, 136/137
[51] Int. Cl. ........................................ H01m 17/00
[58] Field of Search........ 136/100 R, 137, 155, 121, 136/22, 83 R, 154, 6 R, 6 LN; 423/445, 479, 449

[56] References Cited
UNITED STATES PATENTS

| | | | |
|---|---|---|---|
| 3,279,952 | 10/1966 | Minnick.......................... | 136/100 R |
| 3,380,855 | 4/1968 | Mahy et al..................... | 136/100 R |
| 3,415,687 | 12/1968 | Methlie.......................... | 136/100 R |
| 3,424,621 | 1/1969 | Rogers............................ | 136/100 R |
| 3,468,716 | 9/1969 | Eisenberg....................... | 136/100 R |
| 3,514,337 | 5/1970 | Braeuer et al. ................. | 136/100 R |
| 3,579,384 | 5/1971 | Abens............................. | 136/155 X |
| 3,700,502 | 10/1972 | Watanabe et al. .......... | 136/100 R X |
| 3,701,688 | 10/1972 | Gabano et al. ................. | 136/155 X |
| 3,751,298 | 8/1973 | Senderoff........................... | 136/6 F |

*Primary Examiner*—Anthony Skapars
*Attorney, Agent, or Firm*—Sherman & Shalloway

[57] ABSTRACT

A positive electrode for high energy primary cells which comprises a homogeneous mixture of a finely divided chlorinated amorphous carbon and an electrically conductive material selected from the group consisting of finely divided conductive carbons, conductive carbon fibers, finely divided conductive metals, conductive metallic fibers and mixtures thereof, said homogeneous mixture being bonded with a synthetic resin binder, with the proviso that the chlorine content of said finely divided chlorinated amorphous carbon ranges between 5 and 70 % by weight of the positive electrode, and a high energy primary cell comprising a subsequently defined positive electrode and a negative electrode of an alkali metal, said positive and negative electrodes being disposed in a cell casing with the interposition of an electrolyte solution consisting of a nonaqueous organic solvent solution of a solute.

20 Claims, 1 Drawing Figure

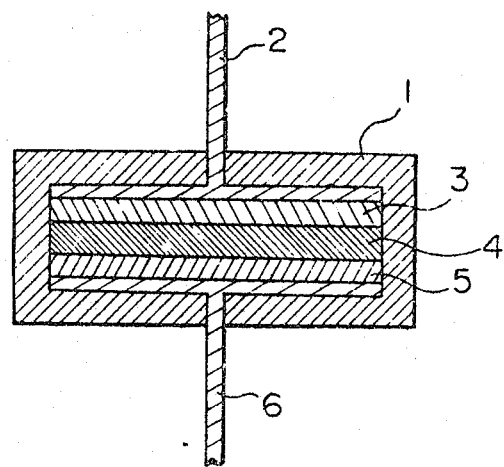

POSITIVE ELECTRODE FOR HIGH ENERGY PRIMARY CELLS AND CELLS USING SAME

This invention relates to a positive electrode for high energy primary cells and a high energy primary cell in which same is used. More particularly, the invention relates to a positive electrode for high energy primary cells, by the use of which electrode it is not only possible to provide a high energy primary cell which, as compared with the case where the conventional positive electrode for high energy primary cells consisting of the metal halides is used, is greatly improved in various respects such as its energy density, voltage decrease during discharge, utilization of active mass, stability to the electrolyte and life; but also possible, as compared with the case where use is made of the conventional carbon fluoride for the electrode, to provide with an exceedingly simple manufacturing procedure and at an advantageously low cost of about one hundredth, a high energy primary cell, which possesses an energy density which, while about one-half that of the case where carbon fluoride is used, is about two times that of the ordinary dry cell and demonstrates comparable improvements with respect to such properties as voltage decrease during discharge, stability to the electrolyte and anti-hygroscopicity; and to a high energy primary cell which uses such a positive electrode.

More specifically, this invention relates to a positive electrode for high energy primary cells which consists of a homogeneous mixture of a finely divided chlorinated amorphous carbon, preferably a finely divided chloride of active carbon which has been activated with a chemical agent, and an electrically conductive material selected from the group consisting of finely divided conductive carbon, conductive carbon fibers, finely divided conductive metals, conductive metallic fibers and mixtures thereof, which homogeneous mixture has been bonded with a synthetic resin binder, with the provision that the chlorine content of the finely divided chlorinated amorphous carbon is 5 – 70 % by weight based on the electrode; and to a high energy primary cell which uses the foregoing electrode.

The high energy primary cells known heretofore are those consisting of a positive electrode of metal halides such as $CuCl_2$, $CuF_2$, $NiCl_2$ and $NiF_2$ and a negative electrode of an alkali metal disposed in a cell casing with the interposition of an electrolyte solution consisting of nonaqueous organic solvent solution of a solute. However, these high energy primary cells have not given fully satisfactory results. As an improvement of the cells such as above described, there has been proposed a high energy primary cell in which a positive electrode of carbon fluoride is substituted for the positive electrode of the foregoing metal halides (German Patent No. 1,919,394).

This high energy primary cell having a carbon fluoride positive electrode is greatly superior to the cell having the aforesaid metal halide positive electrode in that its energy density is high, its voltage decrease during discharge is small, as well as that it possesses satisfactory stability to the electrolyte solution and anti-hygroscopicity. On the other hand, there is the disadvantage that the manufacture of the carbon fluoride, the material used for the positive electrode, has imposed numerous limitations from the operations and equipment standpoint to make for difficulty in its manufacture as well as to result in the cost of its manufacture being exceedingly high.

Hence, where high energy primary cells are used which do not require as high an energy density as that of the high energy primary cell having the carbon fluoride positive electrode (for brevity to be hereinafter referred to, at times, as carbon fluoride cell), yet do require an energy density higher than the primary cell having the metal halide positive electrode (for brevity to be hereinafter referred to, at times, as metal halide cell), a sufficiently high energy density and utilization of active mass, and favorable comparison with the carbon fluoride cell in respect of its voltage decrease during discharge, stability to the electrolyte solution and anti-hygroscopicity, as well as simple at a sufficiently low cost can be obtained with the primary cell according to the present invention; and, the carbon fluoride cell is not of practical use because of its difficulty of manufacture and excessively high cost.

In consequence of our research with a view to providing a positive electrode for high energy primary cells in which the foregoing difficulties have been overcome and also a cell which uses same, we found that the foregoing objective could be achieved by utilizing as the material for the positive electrode a chlorinated amorphous carbon, whose utilization as a material for the positive electrode of the usual cells has never been suggested in the past, not to mention of its utilization as a material for the positive electrode of a high energy primary cell. It was found that by the use of the chlorinated amorphous carbon as the material for the positive electrode a high energy primary cell greatly superior to the metal halide cells with respect to its energy density and utilization of active mass as well as voltage decrease during discharge, stability to the electrolyte solution and length of life could be obtained. In addition, it was found that by the use of the chlorinated amorphous carbon as the material for the positive electrode of a high energy primary cell it was possible to provide such an electrode and a cell using same, which has properties comparable to those of the carbon fluoride cell, and moreover that this could be accomplished with a simple manufacturing procedure and at a low cost of about one hundredth of that of the case of the manufacture of the carbon fluoride as a result of having overcome the difficulties that were involved in the case of the manufacture of the carbon fluoride.

The electromotive force of the alkali metal/chloride type cell is usually smaller than that of the alkali metal/fluoride type cell. It was however found that the electromotive force of the invention cell which utilizes a chlorinated amorphous carbon as the positive electrode material (for brevity hereinafter to be referred to, at times, as chlorinated carbon cell) equaled that of the alkali metal/fluoride cell due to the comparative smallness of the bond energy between the carbon and chloride.

It was further found that when a chlorinated amorphous carbon such as indicated above was used as the positive electrode material a chlorinated carbon cell could be provided without using an electrolyte solution consisting of a nonaqueous organic solvent solution of a solute as in the case of an alkali/metal/chloride or fluoride type cell but using an electrolyte solution consisting of an aqueous solution of a solute, using as the negative electrode material a metal selected from the group consisting of Mg, Zn, Cd and Al.

It is therefore an object of the present invention to provide a positive electrode for high energy primary cells and a cell using same in which the resulting cell is one having an energy density and utilization of mass that are exceptionally higher than the conventional metal halide cells as well as in which the properties such as voltage decrease during discharge, stability to the electrolyte solution and anti-hygroscopicity are much superior to those of the conventional metal halide cell; and additionally the resulting cell is one which has properties comparable to those of a carbon fluoride cell and moreover can be obtained with a simple manufacturing procedure and at a low most of about one hundredth as a result of having overcome the difficulties that were involved in the case of the manufacture of the carbon fluoride cell.

Other objects and advantages of the present invention will become apparent from the following description.

A reaction as shown by the following equation takes place in the invention chlorinated carbon cell when the positive electrode for high energy primary cells of this invention is used along with a negative electrode material of metallic Li.

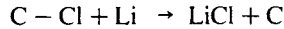

$$C - Cl + Li \rightarrow LiCl + C$$

This reaction proceeds smoothly, and the active mass of the positive electrode can be utilized to a high degree. The chlorinated carbon used as the positive electrode material in this invention is a finely divided amorphous carbon, preferably a chloride of active carbon activated with a chemical agent, whose chlorine content is at least 20 % by weight, preferably 20 – 80 % by weight, and still more preferably 35 – 75 % by weight.

The terminology "the chlorine content of the chlorinated carbon is at least $x\%$ by weight" refers to the chlorine content of a chlorinated carbon after exposure of a sample of the chlorinated carbon for one hour at 150°C. under reduced pressure of 0.02 mm Hg and is a value which excludes the chlorine that has been separated by the foregoing reduced pressure treatment. The chlorine to become the basis of the chlorine content in this invention is that which does not demonstrate the power of oxidizing the iodine ion ($I^-$) to iodine ($I_2$) and is to be distinguished from free chlorine.

Chlorinated carbons are known per se. They can be provided by chlorinating the carbonaceous materials such, for example, as active carbon, carbon black, graphite and charcoal with a chlorinating agent such as chlorine gas, hydrogen chloride gas and carbon tetrachloride gas. Thus, the amorphous carbonaceous material that has been chlorinated is used in the present invention. The so-called gas-activated active carbon, which has been obtained by carbonizing a carbonizable material such as charcoal at an elevated temperature of not over 800°C. in an atmosphere of an inert gas in the substantially absence of oxygen followed by activation at about 800 – 1000°C. with either steam, carbon dioxide or combustion gas can also be used, but preferred is that which has been activated with a chemical agent.

The active carbon activated with a chemical agent is well known. It can be obtained by admixing a chemical agent such, for example, an zinc chloride, phosphoric acid, sulfuric acid or potassium sulfide with a carbonizable material such as charcoal and causing the chemical to become impregnated in the carbonizable material and thereafter activating this impregnated material by heat-carbonizing it at temperature of the order of 300° – 700°C. in an atmosphere of an inert gas in the substantial absence of oxygen. The chlorinated amorphous carbon material preferably used in this invention can be obtained by heating a known active carbon activated with a chemical agent, such as described above, for about 2 – 4 hours at a temperature of about 300° to about 700°C. in an atmosphere, say, of chlorine gas. In the present invention, the term "amorphous carbon" is meant to be one whose degree of graphitization ($l-p$), as proposed by R. E. Franklin in "Acta Crystallographica" 4 253 (1951), is below 0.8.

Further, the chlorinated carbon used in the invention is presumed as not being the first stage type compound which contains the chlorine atoms in the whole of interlayer of the hexagonal network layers of carbon atoms. The reason therefor is that the chlorinated amorphous carbon used in the invention has in itself considerable conductivity, and hence appreciable conductivity is exhibited even though other electrically conductive materials are not used conjointly therewith. Especially desirable results are had by the conjoint use of an electrically conductive material selected from the group consisting of finely divided electrically conductive carbons, electrically conductive carbon fibers, finely divided electrically conductive metals, electrically conductive metallic fibers and mixtures thereof. As such metals, mention can be made of such, for example, as nickel, copper, silver and aluminum.

The positive electrode for high energy primary cells of the present invention consists of a homogeneous mixture of the hereinbefore-described finely divided chlorinated amorphous carbon and an electrically conductive material that have been bonded with a synthetic resin binder. An electrode such as described can be obtained either by preparing a homogeneous mixture of the aforesaid finely divided chlorinated amorphous carbon, the electrically conductive material and the synthetic resin binder powder and then molding this mixture into the desired shape by hot pressing it, or by dissolving the synthetic resin binder in a solvent such as toluene or tetrahydrofurane and admixing the finely divided chlorinated carbon and electrically conductive material to prepare a homogeneous paste followed by applying this paste to a metallic netting or the like and thereafter heat-drying the paste-applied metallic netting.

The synthetic resin binder to be used in this case include such, for example, as polyethylene, polypropylene, chlorinated polyethylene, polytetrafluoroethylene, polytrifluoromonochloroethylene and mixtures thereof.

A reinforcing filler can be incorporated in the invention positive electrode, if desired. Further, this filler can also serve as the electrically conductive material. As such a filler, mention can be made of the conductive or nonconductive carbon fibers, the conductive or nonconductive metallic fibers, the synthetic fibers of a nature similar to or different from the aforesaid synthetic resin binder and mixtures of two or more of these fillers. Further, it is also possible to incorporate an electrically conductive supporting structure consisting of a conductive metallic network structure.

The lower limit of the chlorine content of the chlorinated amorphous carbon in the invention positive electrode, based on the weight of the electrode, is 5 %, preferably 10 %, and still more preferably 15 %. If the chlorine content is less than these values, an undesirable tendency occurs in that the energy density becomes small. On the other hand, the upper limit of this chlorine content is about 70 %, and preferably 65 % by weight. A chlorinated amorphous carbon containing chlorine in excess of this upper limit tends to make for difficulty of its production.

The homogeneous mixture used for making the invention positive electrode should preferably contain, based on the electrode, 5 – 70 % by weight of the finely divided chlorinated carbon, 0.5 – 40 % by weight of the electrically conductive material and 5 – 40 %, and preferably 10 – 35 %, by weight of the synthetic resin binder.

According to the present invention, the hereinbeforedescribed excellent chlorinated carbon cell can be provided by using the above-described positive electrode of the present invention.

The construction of the cell is well known per se. Since a lengthy discussion concerning the construction of a cell would serve no useful purpose but only be verbose, the particulars will be omitted in describing the procedure of making a cell. The hereinbefore-described invention positive electrode and a negative electrode of an alkali metal (the term "alkali metal", as herein used, is meant to include the alloys made up of the alkali metals) such, for example, as Na, K and Li are disposed in a suitable cell casing with the interposition of an electrolyte solution consisting of a nonaqueous organic solvent solution of a solute. In the present invention, also usable as the negative electrode are those of the metals (the term "metals," as herein used, is meant to include the alloys of these metals) selected from the group consisting of magnesium, zinc, cadmium and aluminum. In this case, the invention positive electrode and a negative electrode of a metal selected from the foregoing group of metals are disposed in a cell casing with the interposition of an electrolyte solution consisting of an aqueous solution of a solute. Needless to say, the positive and negative electrodes are each fitted with a collector which makes the flow of electricity possible.

The electrolyte solution to be used in the case of the hereinabove-described alkali metal/invention positive electrode type cell should preferably be one having the property of dissolving and eliminating the reaction product formed for preventing the accumulation of the reaction product at the surfaces of the electrodes and enhancing the energy efficiency. Again, for preventing the self-discharge and increasing the life of the cell, preferred is an electolyte solution which hardly dissolves the active mass at the positive and negative electrodes. As the solute of an electrolyte solution meeting the foregoing requirements, there can be mentioned such, for example, as the alkali metal perchlorates as sodium perchlorate, potassium perchlorate and lithium perchlorate; the chlorides such as sodium chloride, potassium chloride, lithium chloride and aluminum chloride; the hexafluorophosphates, tetrafluoroborates and thiocyanates of the alkali metals; tetrabutylammonium iodide; and mixtures thereof. On the other hand, the nonaqueous organic solvents for dissolving these solutes include the cyclic esters such as butyrolactone, propylene carbonate and ethylene carbonate; the linear esters such as methyl formate, n-butyl formate, methyl acetate, ethyl acetate and ethyl acetoacetate; and acetonitrile, propionitrile, dimethylformamide, dimethyl sulfoxide, nitromethane and 2-pentanone. Mixtures of two or more of these solvents may also be used.

In the case of the cell consisting of a metal selected from the group consisting of Mg, Zn, Cd and Al and the positive electrode of this invention, the electrolyte solution used includes either an aqueous solution of such, for example, as magnesium chloride zinc chloride, cadmium chloride, aluminum chloride and ammonium chloride, which salts may be used singly or in combination, or an aqueous solution of a caustic alkali such, for example, as caustic potash, such as used in the usual alkaline cells.

Further, a separator, say, of polyethylene, polyvinyl chloride, polytetrafluoroethylene or polypropylene can be disposed between the two electrodes of the invention chlorinated carbon cell, if desired.

Again, the chlorinated amorphous carbon used in the present invention can be used mixed with manganese dioxide, the active mass of the positive electrode of the conventional manganese cell.

The following examples, along with control experiments, will be given for illustrating several modes of manufacturing the positive electrode of the present invention and the chlorinated carbon cells using such a positive electrode.

EXAMPLES 1 AND 2 AND CONTROLS 1 AND 2

A mixture consisting of 65 % by weight of a chlorinated carbon powder (containing 48 % by weight of chlorine), 19 % by weight of electrically conductive acetylene black, 15 % by weight of a tetrafluoroethylene powder (binder) and 1 % by weight of carbon fibers (reinforcing filler) was thoroughly mixed in an agate mortar and then, using a nickel net of 50 mesh (electrically conductive supporting structure) as a core, was hot pressed at 200°C. with a pressure of 3 tons per square centimeter and molded into an electrode having a dimension of 90 × 40 × 1 mm.

Using the so obtained invention positive electrode, the invention chlorinated carbon cell illustrated by means of a sectional view in the accompanying drawing was made. In the drawing the reference numerals 1 stand for the cell casing of polyethylene, 2 for the collector (made of nickel) of the negative electrode, 3 for the negative electrode consisting of a lithium plate, 4 for the electrolyte and consisting of lithium chloride and aluminum chloride ($LiAlCl_4$) in solution in propylene carbonate (1 mol/liter), 5 for the aforesaid positive electrode and 6 for the collector (made of nickel) of the positive electrode.

The performance of this cell was as follows: Its open circuit voltage was 3.5 volts and cell voltage at a current density of 3 $mA/cm^2$ was 3.3 volts, and its discharge curve was flat. Even after the cell was left standing for 10 months, a drop in its capacity due to self-discharge was not noted (Example 1).

A cell was made in the same manner as described hereinabove, except that the positive electrode used was one obtained as described above but using a polyethylene powder instead of the tetrafluoroethylene powder, omitting the nickel net and hot pressing at 120°C. at a pressure of 3 tons per square centimeter (Example 2). The performance of this cell was as follows: Its open circuit voltage was 3.4 volts and cell voltage at a current density of 3 $mA/cm^2$ was 3.1 volts, and its discharge curve was flat. There was noted no drop in the capacity of cell even after it was left standing for a period of 10 months.

By way of comparison, the results obtained in the case of a conventional cell of the same construction as in Example 2, which used a nickel chloride positive electrode (Control 1) and the results obtained in the case of a cell of the same construction as in Example 2 but using carbon fluoride (containing 61 % by weight of fluorine) instead of the chlorinated carbon (Control 2) are also shown in Table 1, below.

Table 1

| Experiment No. | Open circuit voltage | (i) Theoretical energy density (WH/kg) | (ii) Voltage decrease during discharge | (iii) Utilization of active mass (%) | (iv) Stability of positive electrode in the electrolyte | (v) Cost index |
| --- | --- | --- | --- | --- | --- | --- |
| Example 1 | 3.5 | 1000 | A (18%) | 80 | A | 1 |
| Example 2 | 3.4 | 1000 | B (23%) | 70 | A | 1 |
| Control 1 | 3.3 | 800 | C (36%) | 50 | D | 3 |
| Control 2 | 3.2 | 2000 | B (22%) | 90 | A | 100 |

NOTE.

i. Theoretical energy density: The quantity (WH) of the electrical power per kilogram of the total active masses used in the positive and negative electrodes, as theoretically calculated from the equation of the reaction between the active masses of the positive and negative electrodes.

ii. Voltage decrease during discharge: The degree of decrease of the cell voltage with time under a constant resistance discharge was evaluated and graded in the following manner:
   A. Where the decrease of voltage after 3 hours after the start of the discharge was not more than 20 % of the initial voltage.
   B. Where the foregoing decrease exceeded 20 % but was not more than 30 %.
   C. Where the foregoing decrease exceeded 30 %.
   The figures in the parentheses indicate the percentage decrease.

iii. Utilization of active mass (%): A value obtained by dividing the quantity (AH) of electricity taken out up to the time the cell voltage drops to one-half the standard voltage by the theoretical quantity of electricity, as calculated from the amount of active mass contained in the cell.

iv. Stability of the positive electrode in the electrolyte: The stability of the positive electrode in the electrolyte was evaluated by comparing the degree of drop in the cell capacity due to self-discharge of the active mass and awarded the ratings A, B, C and D, as indicated below.
   A. Degree of drop not more than 5 % in 30 days.
   B. Degree of drop exceeding 5 % but not more than 25 % in 30 days.
   C. Degree of drop exceeding 25 % but not more than 50 % in 30 days.
   D. Degree of drop exceeding 50 % in 30 days.

v. Cost index: An index calculated using 100 as the cost of the active mass of the positive electrode of Control 2.

EXAMPLE 3

A cell was made as in Example 1, except that a sodium plate was used for the negative electrode 3, a solution in butyrolactone of sodium perchlorate (1.2 mol/liter) was used as the electrolyte 4, an electrode obtained by hot pressing a mixture of 75 % by weight of a chlorinated carbon powder (containing 43 % by weight of chlorine), 24 % by weight of a polyethylene powder and 1 % by weight of carbon fibers at 120°C. and 3 tons per square centimeter was used as the positive electrode 5, while the other constituent parts of the cell were as in Example 1. The so obtained cell exhibited an open circuit voltage of 3.2 volts and a cell voltage of 2.9 volts when discharged at a current density of 3 mA/cm$^2$. and its discharge curve was flat. No drop in the capacity of the cell was noted even after it was left standing for several months.

EXAMPLE 4

A cell was made as in Example 1, except that a potassium plate was used for the negative electrode 3, a solution of potassium perchlorate in dimethylformamide (1 mol/liter) was used as the electrolyte 4, while the rest of the constituent parts of the cell were as in Example 1. The so obtained cell exhibited an open circuit voltage of 3.1 volts and a cell voltage of 2.9 volts when discharged at a current density of 3 mA/cm$^2$, and its discharge curve was flat. No drop in the capacity of the cell was noted even when it was left standing for several months.

EXAMPLE 5

A cell was made as in Example 1, except that a solution of lithium perchlorate in propylene carbonate (1 mol/liter) was used as the electrolyte 4, and as the positive electrode 5 was used an active mass consisting of 60 % by weight of a chlorinated carbon powder (containing 80 % by weight of chlorine) and 20 % by weight of a polytetrafluoroethylene powder, to which was added 19 % by weight of acetylene black and 1 % by weight of carbon fibers, followed by molding this mixture into an electrode at 200°C. and 3 tons/cm$^2$. The other constituent parts of the cell were identical to those of the cell of Example 1. The so obtained cell exhibited an open circuit voltage of 3.2 volts and a cell voltage of 3.0 volts at a current density of 3 mA/cm$^2$, and its discharge curve was flat. No drop in the capacity of the cell was noted even after it was left standing for several months.

EXAMPLE 6

A pasty mixture was prepared by mixing with 60 % by weight of a chlorinated carbon powder (containing 60.5 % by weight of chlorine), 20 % by weight of chlorinated polyethylene as the binder, 18 % by weight of acetylene black as the conductive agent and 2 % by weight of polyethylene oxide. This mixture was then applied to a nickel net, a conductive supporting material, heat-dried and thereafter molded. This was then submitted to a water treatment to elute the polyethylene oxide and obtain a porous electrode.

This electrode demonstrated practically no swelling even though it was dipped in water and organic solvents such as butyrolactone and propylene carbonate and maintained an adequate mechanical strength. Further, its conductivity was also good (total resistance $10^{-3}$ ohms), and its ohmic drop was small.

EXAMPLE 7

A mixture consisting of 65 % by weight of a chlorinated carbon powder (containing 50 % by weight of chlorine), 19 % by weight of acetylene black, 15 % by weight of a polyethylene powder and 1 % by weight of carbon fibers was hot pressed at 120°C. and 3 tons/cm$^2$ to obtain a positive electrode. A cell consisting of the so obtained positive electrode, a negative electrode consisting of a zinc plate and, as the electrode, a 25 % by weight aqueous zinc chloride solution was made. The so obtained cell exhibited an open circuit voltage of 1.6 volts and a cell voltage at a current density of 1 mA/cm$^2$ of 1.35 volts, and its discharge curve was flat.

A substantially similar performance was demonstrated when an aqueous solution of 30 % by weight of ammonium chloride and 6 % by weight of zinc chloride was used as the electrolyte solution.

EXAMPLE 8

A positive electrode was made by hot pressing a mixture consisting of 70 % by weight of a chlorinated carbon powder (containing 43 % by weight of chlorine), 29 % by weight of a polyethylene powder and 1 % by weight of carbon fibers at 120°C. and 3 tons/cm$^2$. A cell was then constructed using the so obtained positive electrode, a negative electrode consisting of a zinc plate and as the electrolyte solution a 40 % aqueous solution of caustic potash. The so obtained cell exhibited an open circuit voltage of 1.54 volts and a cell voltage at a current density of 1 mA/cm$^2$ of 1.3 volts, and its discharge curve was flat.

EXAMPLE 9

A positive electrode was made by hot pressing at 120°C. and 3 tons/cm$^2$ a mixture consisting of 60 % by weight of a chlorinated carbon powder (containing 60 % by weight of chlorine), 19 % by weight of acetylene black and 1 % by weight of carbon fibers. Using the so obtained positive electrode and as the negative electrode a magnesium plate and as the electrolyte solution a 40 % by weight aqueous magnesium chloride solution, a cell was constructed. The so obtained cell had an open circuit voltage of 2.5 volts and a cell voltage at a current density of 1 mA/cm$^2$ of 2.2 volts, and its discharge curve was flat.

EXAMPLE 10

A cell was made using as the positive electrode one made as in Example 9, as the negative electrode an aluminum plate and as the electrolyte solution a 30 % by weight aqueous solution of caustic potash. The so obtained cell exhibited an open circuit voltage of 1.8 volts, and a cell voltage of 1.5 volts at a current density of 1 mA/cm$^2$ and its discharge curve was flat.

EXAMPLE 11

A positive electrode was obtained by hot pressing at 120°C. and 3 tons/cm$^2$ a mixture consisting of 40 % by weight of a chlorinated carbon powder (containing 50 % by weight of chlorine), 30 % by weight of electrolyte manganese dioxide, 14 % by weight of acetylene black, 15 % by weight of a polyethylene powder and 1 % by weight of carbon fibers. Using the so obtained positive electrode and as the negative electrode a zinc plate and as the electrolyte solution an aqueous solution of 30 % by weight of ammonium chloride and 6 % by weight of zinc chloride, a cell was constructed. The so obtained cell exhibited an open circuit voltage of 1.65 volts and a cell voltage at a current density of 1 mA/cm$^2$ of 1.40 volts, and its discharge curve was flat.

The voltage decrease during discharge, the utilization of active mass and the stability of positive electrode in the electrolyte in Examples 3 – 11 are summarized in the following table.

Table

| | Voltage decrease during discharge | Utilization of active mass (%) | Stability of positive electrode in the electrolyte |
|---|---|---|---|
| Example 3 | B | 70 | A |
| Example 4 | A | 75 | A |
| Example 5 | A | 86 | A |
| Example 6 | — | — | A |
| Example 7 | A | 80 | A |
| Example 8 | A | 75 | A |
| Example 9 | A | 68 | A |
| Example 10 | A | 70 | A |
| Example 11 | A | 75 | A |

We claim:
1. A positive electrode for high energy primary cells which comprises a homogeneous mixture of a finely divided chlorinated amorphous carbon whose chloride content ranges between 20 and 80% by weight and an electrically conductive material selected from the group consisting of finely divided conductive carbons, conductive carbon fibers, finely divided conductive metals, conductive metallic fibers and mixtures thereof, said homogeneous mixture being bonded with a synthetic resin binder, and the chlorine content of said finely divided chlorinated amorphous carbon ranges between 5 and 70% by weight of the positive electrode.

2. A positive electrode according to claim 1 wherein said chlorine content ranges between 10 and 65 % by weight of the positive electrode.

3. A positive electrode according to claim 1 wherein said synthetic resin binder is a resinous binder selected from the group consisting of polyethylene, polypropylene, chlorinated polyethylene, polytetrafluoroethylene, polytrifluoromonochloroethylene and mixtures thereof.

4. A positive electrode according to claim 1 wherein said electrode includes a core of an electrically conductive supporting structure consisting of a network structure of a conductive metal.

5. A positive electrode according to claim 1 wherein the amount of said electrically conductive material is 0.5 – 40 % by weight of the electrode.

6. A positive electrode according to claim 1 wherein the amount of said synthetic resin binder is 5 – 40 % by weight of the electrode.

7. A high energy primary cell comprising a positive electrode and a negative electrode of an alkali metal, said positive and negative electrodes being disposed in a cell casing with the interposition of an electrolyte solution consisting of a nonaqueous organic solvent solution of a solute, said positive electrode comprising a homogeneous mixture of a finely divided chlorinated amorphous carbon and an electrically conductive material selected from the group consisting of finely divided conductive carbons, conductive carbon fibers, finely divided conductive metals, conductive metallic fibers and mixtures thereof, said homogeneous mixture being bonded with a synthetic resin binder, and the chlorine content of said finely divided chlorinated amorphous carbon ranges between 5 and 70 % by weight of the positive electrode.

8. A cell according to claim 7 wherein said synthetic resin binder is a resinous binder selected from the group consisting of polyethylene, polypropylene, chlorinated polyethylene, polytetrafluoroethylene, polytrifluoromonochloroethylene and mixtures thereof.

9. A cell according to claim 7 wherein the amount of said electrically conductive material is 0.5 – 40 % by weight of the positive electrode.

10. A cell according to claim 7 wherein the amount of said synthetic resin binder is 5 – 40 % by weight of the positive electrode.

11. A cell according to claim 7 wherein said solute is a compound soluble in said organic solvent and selected from the group consisting of perchlorates of alkali metals, chlorides of alkali metals, aluminum chloride, hexafluorophosphates of alkali metals, tetrafluoroborates of alkali metals, thiocyanates of alkali metals, tetrabutylammonium iodide and mixtures thereof.

12. A cell according to claim 7 wherein said nonaqueous organic solvent is a compound selected from the group consisting of the cyclic esters, linear esters, acetonitrile, propionitrile, dimethylformamide, dimethyl sulfoxide, nitromethane, 2-pentanone and mixtures thereof.

13. A high energy primary cell comprising a positive electrode and a negative electrode of a metal selected from the group consisting of magnesium, zinc, cadmium and aluminum, said positive and negative electrodes being disposed in a cell casing with the interposition of an electrolyte solution consisting of an aqueous solution of a solute, said positive electrode comprising a homogeneous mixture of a finely divided chlorinated amorphous carbon and an electrically conductive material selected from the group consisting of finely divided conductive carbons, conductive carbon fibers, finely divided conductive metals, conductive metallic fibers and mixtures thereof, said homogeneous mixture being bonded with a synthetic resin binder, and the chlorine content of said finely divided chlorinated amorphous carbon ranges between 5 and 70 % by weight of the positive electrode.

14. A cell according to claim 13 wherein said synthetic resin binder is a resinous binder selected from the group consisting of polyethylene, polypropylene, chlorinated polyethylene, polytetrafluoroethylene, polytrifluoromonochloroethylene and mixtures thereof.

15. A cell according to claim 13 wherein the amount of said electrically conductive material is 0.5 – 40 % by weight of the positive electrode.

16. A cell according to claim 13 wherein the amount of said synthetic resin binder is 5 – 40 % by weight of the positive electrode.

17. A cell according to claim 13 wherein said solute is a water-soluble compound selected from the group consisting of magnesium chloride, cadmium chloride, aluminum chloride, ammonium chloride, sodium hydroxide, potassium hydroxide and mixtures thereof.

18. The positive electrode of claim 1 wherein the chlorine content of said finely divided chlorinated amorphous carbon ranges between 35 – 80% by weight.

19. The high energy primary cell of claim 7 wherein the chlorine content of said finely divided chlorinated amorphous carbon ranges between 35 – 80% by weight.

20. The high energy primary cell of claim 13 wherein the chlorine content of said finely divided chlorinated amorphous carbon ranges between 35 – 80% by weight.

* * * * *